Sept. 10, 1963   D. I. STEELE   3,103,119
MASS FLOWMETER
Filed March 24, 1959   3 Sheets-Sheet 2
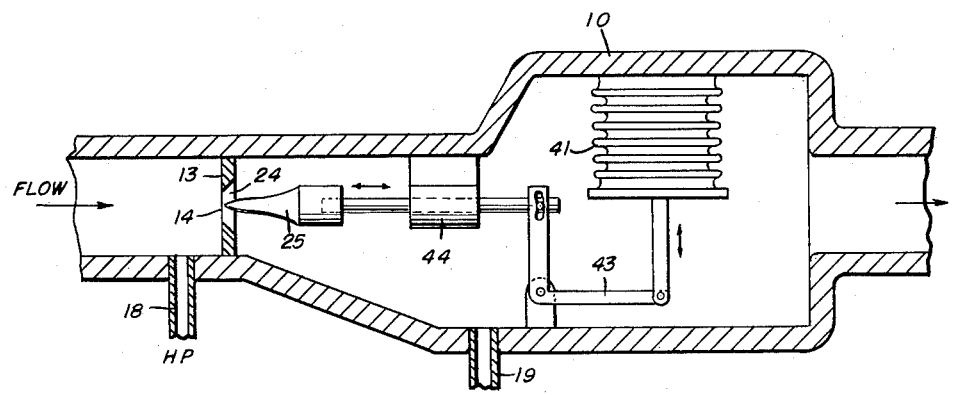
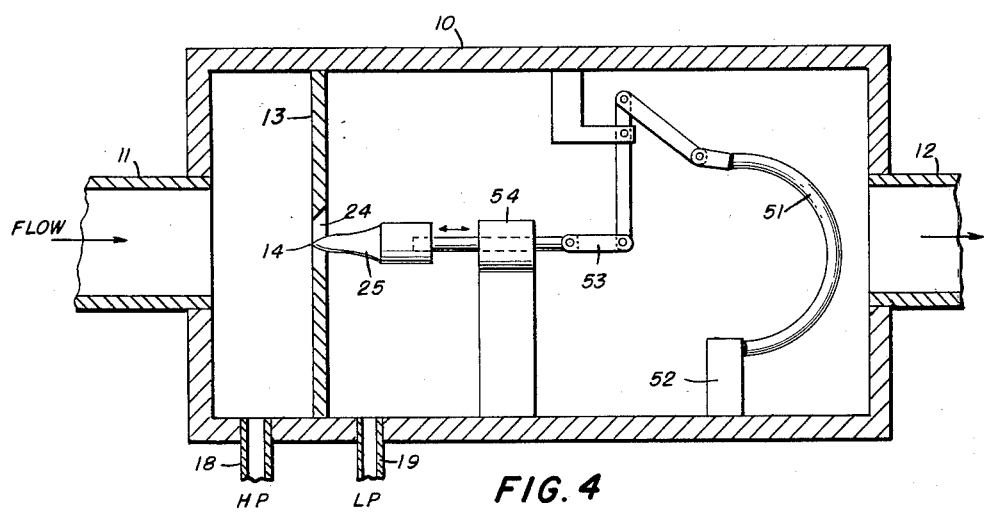
INVENTOR
DALE I. STEELE
BY *Morris Fidelman*
ATTORNEY Sept. 10, 1963    D. I. STEELE    3,103,119
MASS FLOWMETER Filed March 24, 1959    3 Sheets-Sheet 3

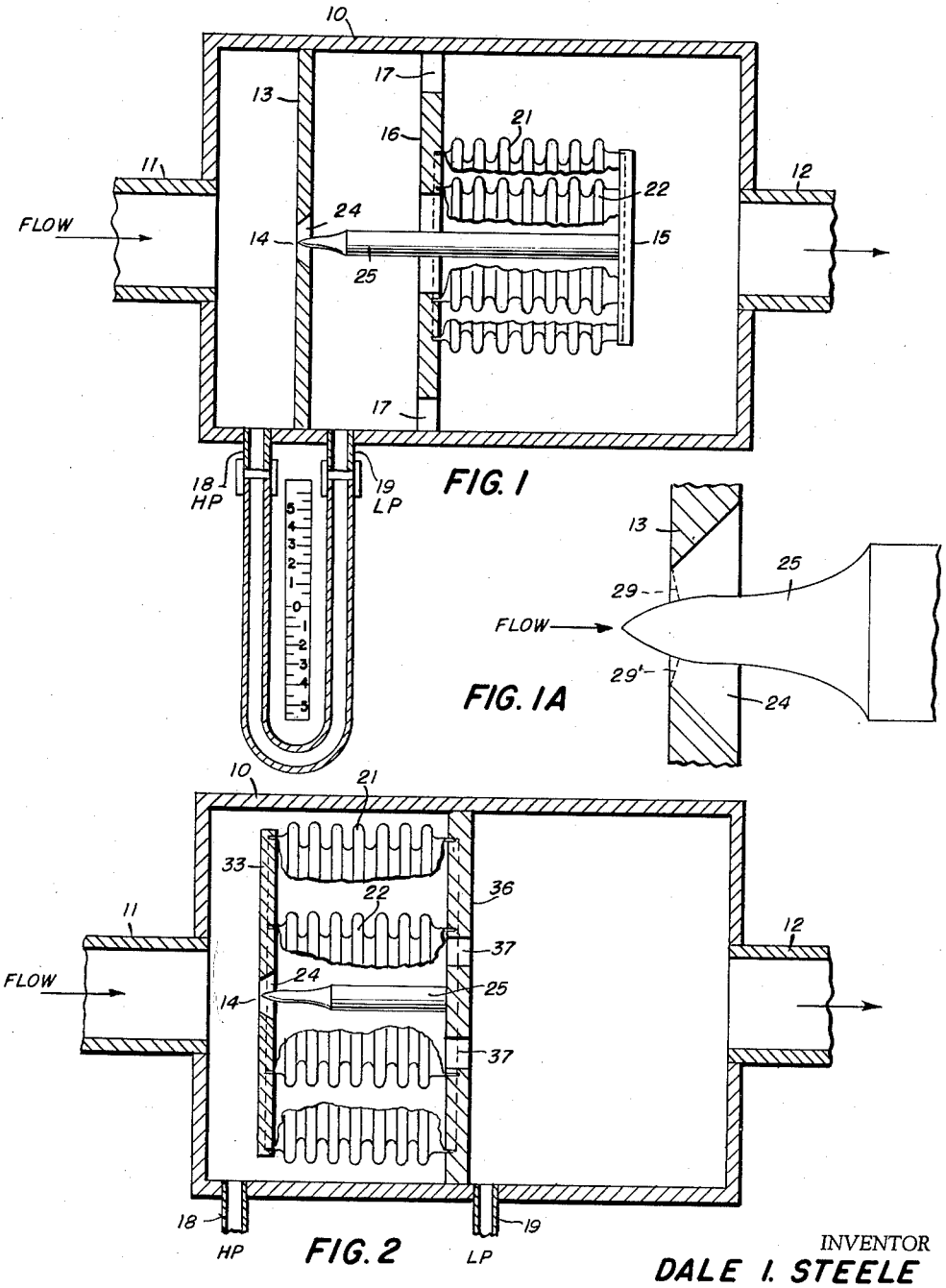

INVENTOR
DALE I. STEELE

BY *Morris Fidelman*

ATTORNEY

Header omitted 3,103,119
MASS FLOWMETER
Dale I. Steele, Silver Spring, Md., assignor to National Instrument Laboratories, Inc., Rockville, Md., a corporation of Maryland
Filed Mar. 24, 1959, Ser. No. 801,576
9 Claims. (Cl. 73—210)

This invention relates to fluid flow measurement. More particularly this invention relates to an arrangement for measuring the mass rate of flow.

The primary object of this invention is to provide a device for accurately measuring the mass rate of flow of a fluid through a conduit.

Further objects and the advantages of this invention will be apparent from the description which follows.

Conventional orifices, nozzles, and venturi tubes produce a differential pressure which is proportional to the product of the fluid density and the square of the volume rate of flow. It can then be shown that the product of the density and the differential pressure is proportional to the mass rate of flow of the fluid. It is one of the purposes of this invention to compensate for changes in density due to changes in pressure and temperature to produce a differential pressure proportional to the square of the mass rate of flow of the fluid over a flow range being measured.

Briefly stated the mass flowmeter of the instant invention is an arrangement of apparatus constructed and arranged so that vapor, liquid or gas flowing therethrough will experience a pressure drop proportional to the square of the mass flow. More explicity, the square root of the pressure differential ($\Delta P$) is proportional to the mass flow rate (M). Measurement of the pressure differential will then determine the mass flow rate of the fluid. For brevity, the term fluid will hereinafter be employed for both liquids (incompressible fluids) and gases (compressible fluids).

This desired object is attained by providing a plate member or an equivalent structure transversely disposed across the flow path, with an opening in the plate through which all the fluid must flow. The opening is formed into an annular orifice by a shaped, relatively movable plug disposed centrally of the opening. Relative movement of the plug and plate is effected by a sealed pressure-temperature responsive element, e.g., bellows, Bourdon tube, diaphragm, etc. It can be demonstrated mathematically that the square root of the pressure drop through such an annular orifice is a unique measure of the mass flow rate.

The equation relating flow rate to head developed as taken directly from "Fluid Mechanism," by Dodge and Thompson, McGraw-Hill, 1937, chapter 11, Equation 13 is given as follows:

(1) $$Q = CA\sqrt{2gH}$$

where

Q is the volumetric rate of flow,
A is the orifice area,
g is the gravitational coefficient,
H is the difference in head, and
C is the coefficient of discharge.

The terms above must be expressed in consistent units.

(2) $$H = \frac{\Delta P}{pg}$$

where $\Delta P$ is the differential pressure, and
p is the fluid density.

The substitution of Equation 2 in Equation 1 gives Equation 3, which is the usual form of the equation for gas flow through an orifice:

(3) $$Q = CA\sqrt{2\frac{\Delta P}{p}}$$

Multiplying both sides of the equation by p gives (4) $$pQ = CA\sqrt{2p\Delta P}$$

It is seen that the product pQ is mass rate of flow designated as M in (5) $$M = CA\sqrt{2p\Delta P}$$

or (6) $$\sqrt{\Delta P} = \frac{1}{CA\sqrt{2p}} \cdot M$$

For a specific gas, p is a function of pressure and temperature as given by (7) $$p = \frac{P}{RT}$$

where

P is the absolute pressure,
T is the absolute temperature, and
R is a constant for the gas.

Substitution of this expression for p in Equation 6 gives (8) $$\sqrt{\Delta P} = \frac{\sqrt{R}}{CA\sqrt{2}} \cdot \sqrt{\frac{T}{P}} \cdot M$$

When the gas is enclosed in a bellows having negligible spring constant, the pressure inside the bellows is equal to the pressure of the gas outside the bellows. Since the bellows is surrounded by the flowing gas, the temperature of the gas inside the bellows is the same as the temperature of the flowing gas. The Boyle's law relation for a gas is that $PV/T$ remains constant. The bellows length is then proportional to the absolute temperature and inversely proportional to the pressure.

Substituting L for $T/P$ in Equation 8, and setting the product of all the constants equal to a new constant, $K_1$, gives (9) $$\sqrt{\Delta P} = \frac{K_1}{A} \cdot \sqrt{L} \cdot M$$

where L is the bellows length.

If $\sqrt{\Delta P}$ is to be proportional to M, then the following condition must hold.

(10) $$A = K_1\sqrt{L}$$

That is, when the plug is so shaped that the annular area of the orifice is proportional to the square root of the bellows length (which is dependent upon the gas temperature and pressure), then the square root of the differential pressure across the annular orifice is proportional to the mass rate of flow of the gas.

In the above analysis it was assumed that the spring constant of the bellows was negligible. For certain applications it is not advantageous or practical to choose such a bellows assembly. In such a case, it is still possible to shape the plug such that total compensation for variation in P and partial compensation for variation in T are attained, or alternatively to attain total compensation for T and partial compensation for P. In practice, the choice of whether to compensate totally for P or for T is governed by the expected magnitudes of the variations of each and the errors which would be produced by the variation of each. By and large no problem has been found in coming within the conventional accuracy limit of 2% throughout the normal operating ranges for flow, temperature and pressure.

As a matter of machine-shop practice, the plug is made oversize and of the general shape given by theory. The entire instrument is assembled, then laboratory tested for the intended installation over the expected flow range, after which the plug diameter is reduced differing amounts along the plug's length whatever degree is indicated by the tests.

Deviations from the above ideal theory are known to arise from two sources, each of which can be taken care of in the final calibration and adjustment of the plug: (1) the orifice coefficient, C, in the above equations may vary slightly as the ratio of the plug diameter to orifice diameter changes; and (2) the effective area of the orifice is not always the free annular area left in the plate opening. On occasion, the orifice area becomes the area of a conical surface which extends from the orifice wall to the nearest part of the plug.

In the case where the flowing fluid is a liquid, the bellows is filled with the same liquid. The density of the fluid inside the bellows remains the same as the density of the flowing fluid and the length of the bellows changes in a more exact inverse proportion to the density than in the case of gases.

Referring to Equation 6, if the bellows length is inversely proportional to the fluid density,

(11) $$\sqrt{\Delta P} = \frac{K_2 M \sqrt{L}}{A}$$

The necessary condition for $\sqrt{\Delta P}$ to be proportional to M is then that

(12) $$A = K_2 \sqrt{L}$$

That is, when the plug is so shaped that the annular area of the orifice is proportional to the square root of the bellows length (which is dependent upon the liquid temperature) then the square root of the differential pressure across the orifice is proportional to the mass rate of flow of the liquid.

While only bellows have been mentioned in the foregoing analysis, it should be understood that the same follows generally for all fluid filled pressure and temperature responsive means whose response is a linear movement, e.g., bellows, Bourdon tube, diaphragm, etc.

For further understanding of the instant invention, reference is made to the attached drawing wherein:

FIGURE 1 diagrammatically illustrates a cross-sectional view of one mode of the invention.

FIGURE 1A is a fragmentary cross-sectional view on an enlarged scale illustrating the relationship of the plate and orifice.

FIGURES 2, 3 and 4 diagrammatically illustrate cross-sectional views of other modes of the invention.

Figure 5:
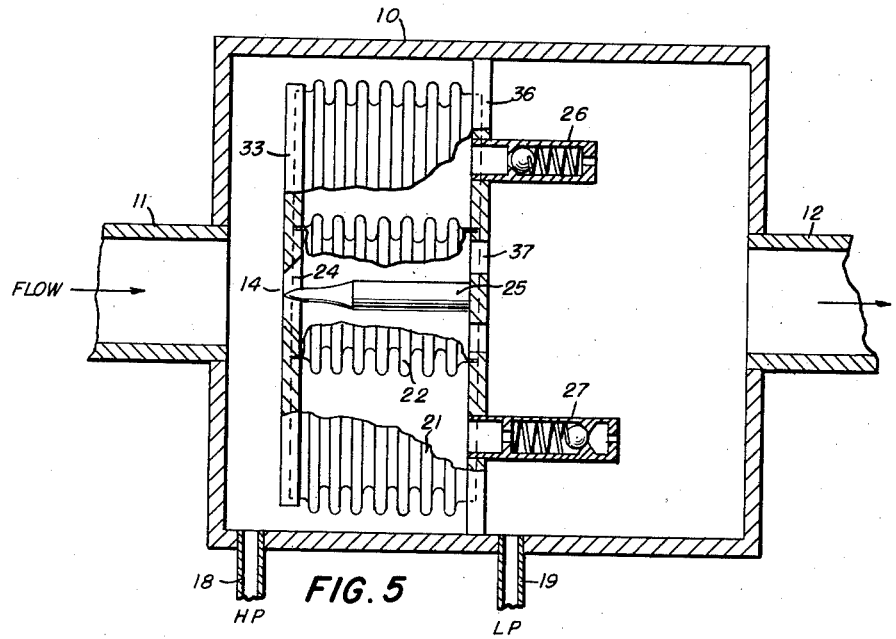
FIGURE 5 illustrates the mode of FIGURE 2 modified by the presence of an auxiliary member.

Throughout the description which follows, the same legend is being used to indicate members common to the different modes illustrated.

Referring now to FIGURE 1 of the drawing, it may be seen that the mass flowmeter of the instant invention constitutes an encased assemblage which can be interposed physically in a closed conduit, e.g., a pipe line, to take the entire gas flow. The gas enters a cylindrical casing 10 through an inlet 11 and leaves by way of outlet 12. An orifice plate 13, transversely disposed across the flow path, is peripherally secured to the inner wall of casing 10 in any suitable manner which prevents gas leakage, e.g., by welding. Save for a machined circular orifice opening 14 centrally thereof, plate 13 blocks the flow path. Ideally, opening 14 is of the sharp-edged type illustrated in the drawing.

Back of plate 13 is an annular spider 16, also transversely disposed across the flow path and peripherally secured as by welding to the inner wall of cylindrical casing 10. A plurality of openings 17 are spaced apart on spider 16 for flow of gas through to outlet 12. Mounted at or adjacent to the inner periphery of spider 16 is one end of a double bellows 21, 22. The other end of double bellows 21, 22 is seated on a back plate 15.

Bellows 21, 22 are hermetically sealed to both back plate 15 and spider 16 by soldering, welding, brazing, or other type of hermetic sealing so that the space between bellows 21, 22 constitutes a closed bellows chamber. An appropriate fluid is sealed inside this chamber. When the mass flow meter is to be used with gases which follow closely the perfect gas laws, any permanent gas, e.g., air, nitrogen, helium, argon, etc., can be sealed inside the bellows chamber. When a gas deviating significantly from the perfect gas laws is to be metered, the gas sealed inside the bellows should be of the same composition as the gas being metered. The expansion or contraction of bellows 21, 22 with line pressure and temperature is thereby related exactly to the pressure-temperature properties of the flowing gas.

The end of plug 25 is shaped according to the following equation:

(13) $$d = \sqrt{D^2 - \frac{4}{\pi} A}$$

where $d$ is the diameter of the plug in the plane of the orifice plate, $D$ is the diameter of the orifice opening.

$A$ is the area computed from Equation 10 or 12.

The plug diameter, $d$, is calculated for several points along its longitudinal axis. Then the contour of the plug is machined to fit the calculated points and be smooth overall according to well known shop practices. Lastly any necessary diameter reduction is made in accord with laboratory test results for the intended installation.

To illustrate that the orifice area may be a conic section, FIGURE 1A shows an actual plug 25 in a position where dotted line 29 is the shortest distance between the periphery of orifice opening 14 and plug 25. In this position the effective area of orifice 24 is the area of the conical frustrum swept by dotted lines 29, 29'.

Thus when fluid flows from inlet 11 through annular orifice 24, then through openings 17 in spider 16 and out outlet 12, the bellows 21, 22 reach an equilibrium position based upon the absolute temperature and pressure of the flowing fluid. The bellows in turn fix the area of orifice 24 by fixing the location of shaped plug 25 relative to plate opening 14 at each pressure-temperature condition in accord with Equation 10. As a result, the pressure differential across orifice 24, which may be measured by a manometer or other differential pressure sensing device (not shown) connected to differential pressure taps 18, 19, is related to true mass flow M in accord with Equation 8. If the line pressure increases or the fluid temperature decreases, for example, contraction of the bellows moves backing plate 15 and shaped plug 25 forward, decreasing the area of annular orifice 24, thereby satisfying Equation 10 to insure that the square root of the differential pressure remains proportional to the mass rate of flow at all times.

FIGURE 2 illustrates a different mode of apparatus to achieve the same differential movement of orifice opening and shaped plug. As in the apparatus of FIGURE 1, there is provided a cylindrical casing with inlet 11, outlet 12, and differential pressure taps 18, 19. In this mode, shaped plug 25 is fixed to a spider 36 transversely disposed across the flow path. Spider 36 is provided with a plurality of openings 37 disposed around plug 25. One end of double bellows 21, 22 is mounted on the spider 36 while the other end of double bellows 21, 22 is secured to a floating orifice plate 33 disposed transversely across the flow path. An orifice opening 14 (now in movable plate 33) and the (now fixed) shaped plug 25 again cooperate to form an annular orifice 24 of variable area. Like the mode of FIGURE 1, all the gas is constrained to flow through inlet 11, annular orifice 24, spider openings 37 and outlet 12. In the mode of FIGURE 2, changes in line pressure and temperature again affect the bellows chamber, but the resulting movement of bellows 21, 22 now causes the plate 33 and its opening 14 to move relative to fixed plug 25 in the manner which varies orifice area with line temperature and pressure changes according to the relationships of Equation 10 at all times. Thus in the mode of FIGURE 2, the square root of the differential pressure as measured through taps 18, 19 is proportional to the mass rate of flow.

FIGURE 5 illustrates an arrangement particularly suitable for use in gas lines where sudden loss of pressure may be anticipated. Provision is made for charging the bellows chamber with gas and at the same time protecting the bellows against an excessive pressure either internally or externally. Two spring loaded check valves 26 and 27 are connected to the bellows chamber in such a manner that one, 27, will admit gas to the bellows when the external pressure exceeds the internal bellows pressure by a preset value. The other check valve, 26, will allow gas to flow out of the bellows chamber whenever the internal bellows pressure exceeds the external pressure by a preset value. This double check valve arrangement makes it possible to use the bellows assembly in mass flowmeters for high pressure pipe lines. As a specific example, a standard bellows will itself withstand a difference in pressure externally and internally of 150 p.s.i.g. and it is desired to use the flowmeter at 2000 p.s.i.g.±100 p.s.i. The check valves 26 and 27 are each preset for pressures of 125 p.s.i.; they will then admit of flow in the proper direction whenever there is a pressure difference across them of 125 p.s.i. Then, when the flowmeter is installed in the pipe line the pressure at the flowmeter is slowly increased from atmospheric pressure to 225 p.s.i.g. at which point the pressure in the chamber is 2000 p.s.i.g. Thereafter any change in line pressure between 2125 p.s.i.g. and 1875 p.s.i.g. will not cause gain or loss of fluid to the inside of the bellows chamber. Therefore the orifice plate 33 moves in accordance with the description given above for operation of this flow element. By the same token if the line pressure is released by intent or accident, when the pressure in the line drops below 1875 p.s.i.g., the pressure in the bellows chamber is relieved by an efflux through valve 26. Obviously, when the line and meter are returned to operation it would be necessary to again attain the line pressure of 2125 p.s.i.g. before this flowmeter is ready for operation.

Figure 6:
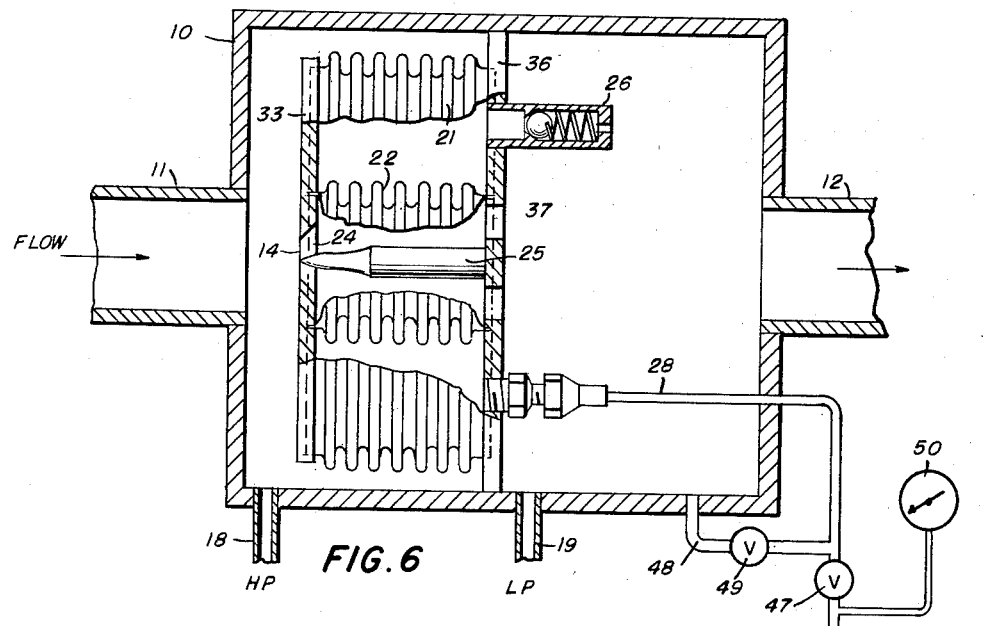
FIGURE 6 is a cross-sectional view showing still a different auxiliary member.

FIGURE 6 shows a modification for pressurizing the bellows more accurately than with the check valve 27 of FIGURE 5. Tubing 28 extends from the bellows chamber through a tap in casing 10 to an outside source of pressure. A manually operated valve 47 is provided in line 28. A by-pass tube 48 and valve 49 are also provided so that line fluid may pressurize the bellows chamber. A pressure gage 50 is used to monitor the pressure inside bellows chamber. In commencing operation, valve 49 is left open and valve 47 closed until the pipe line and the bellows chamber are approximately at operating pressure. Valve 49 is closed and valve 47 opened and an outside source pressure is applied from P until the exactly desired gas pressure exists inside the bellows chamber. Thereafter valve 47 is tightly closed and, if desired, the outside source of pressure removed from the area.

FIGURE 3 illustrates a mass flowmeter constructed with a single bellows. For this mode, as in the mode of FIGURE 1, casing 10 is provided with a fixed orifice plate 13 and a movable shaped plug 25. A single sealed bellows 41 is secured at one end to the casing wall and at the other end to a linkage system 43 which moves the shaped plug relative to fixed plate 13 according to pressure-temperature induced variations in the length of bellows 41. A guide sleeve 44 rigidly mounted inside casing 10 serves to keep shaped plug 25 aligned in orifice 24. Here again differential pressure taps 18, 19 measure a pressure differential, the square root of which is proportional to the mass flow rate.

FIGURE 4 illustrates a mass flowmeter using the principles heretofore outlined, but constructed with a Bourdon tube. Again the casing structure contains inlet 11, outlet 12, taps 18, 19. Internally of casing 10 is a fixed orifice plate 13 and a movable shaped plug 25. A Bourdon tube 51 is attached at one end to a rib 52 on the casing wall and at the other end to a linkage mechanism 53. Linkage mechanism 53 is arranged to move shaped plug 25 relative to orifice opening 14. A guide sleeve 54 rigidly mounted inside casing 10 serves to maintain shaped plug 25 aligned in orifice 24. Flexing of Bourdon tube 51 with changes in line pressure and temperature causes appropriate movement of shaped plug 25 and change in the area of annular orifice 24. Here again the square root of the differential pressure across taps 18, 19 is proportional to the mass flow rate.

In passing, it should be noted that while FIGURE 1 illustrates the mode which would ordinarily be preferred for most installations, the structure of FIGURE 2 is particularly adapted for use when the operating range to be measured requires a long bellows. Similarly, the Bourdon tube structure of FIGURE 4 is particularly adapted for high pressure measurement.

Still other variations in the construction and arrangement of the mass flowmeter are contemplated without parting from the spirit and purpose of the instant invention. Thus, for example, while the foregoing description of the invention has been in terms of a plate physically disposed across the flow path, the outside wall of the flow path may be itself constricted to the point of leaving only an orifice opening thereby performing the functions of both the wall and the fixed plate.

What is claimed is:

1. An instrument for measuring mass flow through a closed conduit which comprises: a plate member disposed transversely across the flow path, said plate member having an opening therein through which the flowing fluid passes; a shaped plug disposed centrally of the opening to form an annular orifice between the plate opening and the plug, said plug extending downstream from a termination point located in the region of said opening and being mounted downstream of said opening; a closed fluid filled pressure and temperature responsive double bellows member annularly disposed around the plug member and secured to one of the named members forming said annular orifice to cause movement thereof relative to the other member in accord with line temperature and pressure changes, whereby the square root of the pressure differential across the orifice is proportional to the mass flow through the conduit over a wide temperature and pressure range; and means for measuring the pressure differential across said orifice.

2. The instrument of claim 1 wherein the chamber between the double bellows is provided with a check valve to release fluid therefrom should pressure in the conduit fall, and means is provided also for pressurizing the said chamber.

3. The instrument of claim 1 wherein means are provided to pressurize the chamber between the double bellows up to about the line pressure of the flowing fluid.

4. The instrument of claim 1 wherein a valved connection is provided between the flow path and the chamber between the double bellows to pressurize the chamber between the double bellows to about line pressure, and wherein a valved connection to an accurate source of pressure is provided, whereby the bellows chamber may first be brought up to approximately line pressure through the flow path connection and then to an accurately known pressure through said second named connection.

5. An instrument for measuring mass flow through a closed conduit which comprises: an annular orifice through which all the fluid is forced to pass, said orifice being formed between an opening in a plate member transversely disposed across the flow path and a shaped plug extending downstream from a termination point located in the region of the opening, said plug being mounted downstream, said plate and plug being relatively movable, whereby the area of said annular orifice is varied; a closed fluid-filled double bellows for relatively moving the plate and plug according to line temperature and pressure changes, said bellows being concentrically disposed about the orifice and secured to one of the two members forming the annular orifice, whereby the square root of the pressure differential across the orifice is proportional to the mass flow rate through the conduit over a wide temperature and pressure range; and means for measuring the pressure differential across said orifice.

6. The instrument of claim 5 wherein the double bellows is disposed annularly around the plug and secured thereto to cause movement thereof relative to said plate.

7. The instrument of claim 5 wherein the double bellows is disposed annularly around the plug and secured to the plate to cause movement thereof relative to said plug.

8. An instrument for measuring mass flow through a closed conduit which comprises: an annular orifice through which flowing fluid is forced to pass and means for measuring the pressure differential across said orifice, said annular orifice being formed between a circular orifice opening in the flow path and a shaped plug mounted downstream of said opening, the cross-sectional area of said plug being progressively reduced in an upstream direction to a termination point located in the region of said opening, said orifice opening and plug being relatively movable whereby the area of said annular orifice is varied; a closed fluid filled pressure and temperature responsive bellows disposed between said orifice opening and a downstream fluid outlet from the instrument, the fluid flowing downstream from said opening passing in heat exchange relationship with a flexible portion of said bellows, said bellows being adapted to relatively move the orifice opening and plug in rapid response to line pressure and temperature changes, whereby an expansion of said bellows causes relative movement of said plug away from said orifice opening and a contraction of said bellows causes relative movement of said plug closer to said orifice opening, wherefore the square root of the pressure differential across the orifice is proportional to the mass flow rate through the conduit over a wide temperature and pressure range.

9. The instrument of claim 8 wherein the bellows is secured to the wall of the conduit, and linked to the shaped plug to cause movement thereof relative to said plate.

References Cited in the file of this patent

UNITED STATES PATENTS

| | | |
|---|---|---|
| 1,416,220 | Long et al. | May 16, 1922 |
| 1,635,040 | Fales | July 5, 1927 |
| 2,675,020 | Breitwieser | Apr. 13, 1954 |
| 2,780,938 | Chamberlain | Feb. 12, 1957 |
| 2,816,441 | Ezekiel | Dec. 17, 1957 |
| 2,858,700 | Rose | Nov. 4, 1958 |